US009011798B2

(12) United States Patent
Shen et al.

(10) Patent No.: US 9,011,798 B2
(45) Date of Patent: Apr. 21, 2015

(54) SWITCHES FOR MICROFLUIDIC SYSTEMS

(75) Inventors: Wei Shen, Glen Waverley (AU); Xu Li, Glen Waverley (AU); Junfie Tian, Oakleigh East (AU); Thanh Huynh Nguyen, Springvale South (AU); Gil Garnier, Franston South (AU)

(73) Assignee: Monash University, Clayton (AU)

( * ) Notice: Subject to any disclaimer, the term of this patent is extended or adjusted under 35 U.S.C. 154(b) by 504 days.

(21) Appl. No.: 13/058,449

(22) PCT Filed: Aug. 10, 2009

(86) PCT No.: PCT/AU2009/001009
§ 371 (c)(1), (2), (4) Date: Jun. 29, 2011

(87) PCT Pub. No.: WO2010/017578
PCT Pub. Date: Feb. 18, 2010

(65) Prior Publication Data

US 2011/0318227 A1 Dec. 29, 2011

(30) Foreign Application Priority Data

Aug. 14, 2008 (AU) ................................ 2008904179

(51) Int. Cl.
*B01L 99/00* (2010.01)
*G01N 33/00* (2006.01)
(Continued)

(52) U.S. Cl.
CPC ......... *B01L 3/502707* (2013.01); *B01L 3/5023* (2013.01); *B01L 3/502738* (2013.01); *B01L 2200/10* (2013.01); *B01L 2300/0864* (2013.01); *B01L 2300/0867* (2013.01); *B01L 2300/087* (2013.01); *B01L 2300/0874* (2013.01); *B01L 2300/0887* (2013.01); *B01L 2300/126* (2013.01); *B01L 2400/0406* (2013.01);
(Continued)

(58) Field of Classification Search
CPC .................. B01L 2300/0887; B01L 2300/126; B01L 2400/0406; B01L 3/5023
USPC .................................................. 422/412, 420
See application file for complete search history.

(56) References Cited

U.S. PATENT DOCUMENTS 5,416,000 A * 5/1995 Allen et al. .................. 435/7.92
5,904,824 A 5/1999 Oh (Continued)

FOREIGN PATENT DOCUMENTS

EP 0590695 4/1994
WO WO 2006/074665 7/2006

(Continued)

OTHER PUBLICATIONS

Bruzewicz et al., "Low-Cost Printing of Poly(dimethylsiloxane) Barriers to Define Microchannels in Paper", Anal. Chem., 2008, 80(9), 3387-3392.

(Continued)

*Primary Examiner* — Paul Hyun

(57) ABSTRACT

A microfluidic system including a substrate in sheet form, at least one hydrophilic microfluidic channel supported on a surface of the substrate, and at least one functional component formed as part of the substrate for providing a functional component for the microfluidic channel wherein the functional component comprises at least one cut within the substrate for providing a switch or filter component for the microfluidic channel.

16 Claims, 5 Drawing Sheets

(a) (b) (c)

(51) Int. Cl.
*B01L 3/00* (2006.01)
*F16K 99/00* (2006.01)

(52) U.S. Cl.
CPC . *B01L 2400/0622* (2013.01); *B01L 2400/0633* (2013.01); *B01L 2400/0677* (2013.01); *B01L 2400/0688* (2013.01); *F16K 99/0001* (2013.01); *F16K 2099/0074* (2013.01); *F16K 2099/008* (2013.01); *F16K 2099/0084* (2013.01); *F16K 2099/0086* (2013.01); *F16K 2099/0092* (2013.01)

(56) References Cited

U.S. PATENT DOCUMENTS 6,518,168 B1 2/2003 Clem et al.
7,125,639 B2 10/2006 Schaper
2002/0155010 A1* 10/2002 Karp et al. ................. 417/413.2
2004/0258885 A1 12/2004 Kreutter et al.
2005/0161669 A1 7/2005 Jovanovich et al.
2007/0134810 A1 6/2007 Yang et al.

FOREIGN PATENT DOCUMENTS

WO WO 2007/000048 1/2007
WO WO 2007/124481 11/2007
WO WO 2008/060449 5/2008
WO WO 2010/003188 1/2010
WO WO 2010/017578 2/2010

OTHER PUBLICATIONS

Citterio et al., "Inkjet-printed microfluid multianalyte chemical sensing paper", Anal. Chem., Aug. 2008, 80, 6928-6934.

Martinez et al., "Patterned Paper as a Platform for Inexpensive, Low-Volume, Portable Bioassays", Angew. Chem. Int. Ed., Feb. 2007, 46(8), 1318-1320.

Martinez et al., "Simple Telemedicine for Developing Regions: Camera Phones and Paper-Based Microfluidic Devices for Real-Time, Off-Site Diagnosis", Anal. Chem., 2008, 80(10), 3699-3707.

Whitesides et al., "Low-cost printing of poly(dimethylsiloxane)barriers to define microchannels in paper", Anal. Chem., May 2008, 80, 3387-3392.

Whitesides et al., "Patterned paper as a platform for inexpensive, low-volume, portable bioassays", Angew. Chem. Int. Ed., Jan. 2007, 46, 1318-1320.

* cited by examiner (a) (b) (c)

(a) (b) (c)

(a) (b) (c)

(a) (b) (c)

(d) (e)

SWITCHES FOR MICROFLUIDIC SYSTEMS

CROSS-REFERENCE TO RELATED APPLICATIONS

This application is the National Stage of International Application No. PCT/AU2009/001009, filed Aug. 10, 2009, which claims the benefit of Australian Application No. 2008904179, filed Aug. 14, 2008, the disclosures of which are incorporated herein by reference in their entireties.

TECHNICAL FIELD

The present invention is generally directed to microfluidic systems; and is in particular directed to switches, filters and other functional components used in such systems. While the invention will be described with respect to paper based substrates in sheet form, it will be appreciated that the invention is not restricted to substrates made of this material and may be used on substrates of other materials such as, for example, hydrophilic polymer substrates.

BACKGROUND OF THE INVENTION

The concept of making inexpensive microfluidic channels on paper and other woven and non-woven fibrous and porous surfaces to produce a microfluidic system been successfully proven. Paper in sheet form is readily obtainable and can produce a very low cost substrate for such a microfluidic system. One aim of building such systems has been to fabricate low-cost bio-analytical and indicator devices, with direct envisaged applications in detecting waterborne bacteria in drinking water, the presence of some specific protein or biomarkers in body fluid (cancer test), the level of glucose and other bio-chemical substances in human or animal blood and urine samples. Development of low-cost paper-based bioanalytical and environmental analytical devices have so far allowed quick and single step reaction to detect analytes in a fluid sample. Researchers in Harvard University led by Whitesides (see Martinez, A. W., Phillips, S. T., Butte, M. J. and Whitesides G. M., and "Platform for Inexpensive, Low-Volume, Portable Bioassays", Angew. Chem. Int. Ed. 46, 1318-1320 (2007)) have recently created channels on paper by printing patterns of conventional photoresists polymers (PDMS). Paper provides the capillary channels, while the photoresist polymers form the barrier which defines the channel. More recently, the Harvard group used an x-y plotter to draw channels on paper surface (see Bruzewicz, D. A., Reches, M. and Whitesides, G. M., "Low-Cost Printing of Poly(dimethylsiloxane) Barriers to Define Microchannels in Paper, Anal Chem. 80, 3387-3392 (2008) and Martinez, A. W.; Phillips, S. T.; Carrilho, E.; Thomas III, S. W.; Sindi, H.; Whitesides, G. M., "Simple telemedicine for developing regions: camera phones and paper-based microfluidic devices for real-time, off-site diagnosis". Anal. Chem. 80 (2008) 3699-3707)). The plotter's pens were filled with a hydrophobic solution of polydimethyl siloxane (PDMS) in hexane, and a plethora of patterns 10 cm long with channel 1 cm to 2 mm wide were created. Their second micro-channels system created on paper surface overcame a major drawback of the first one, ie the rigid and brittle barrier material of conventional photoresist polymers. Their second system, however, has a poor channel resolution and definition, since the penetration of PDMS solution in paper sheet cannot be controlled.

In U.S. Pat. No. 7,125,639, Molecular Transfer lithography, the inventor Charles Daniel Schaper (class 430/253, 430/258) describes a process for patterning a substrate comprising the steps of: 1) coating a carrier with a photosensitive material, 2) exposing the photosensitive material to a pattern of radiation, and 3) physically transferring the exposed material to the substrate.

In U.S. Pat. No. 6,518,168, Self-assembled monolayers direct patterning of surfaces, by Paul G Clem et al (filing date Nov. 2, 1998), A technique for creating patterns of material deposited on a surface involves forming a self-assembled monolayer in a pattern on the surface and depositing, via chemical vapor deposition or via sol-gel processing, a material on the surface in a pattern complementary to the self-assembled monolayer pattern. The material can be a metal, metal oxide, or the like.

In WO/2008/060449 MICROFLUIDIC DETECTOR, by BUTTE, Manish, J. et al (Application date Nov. 9, 2007), Articles and methods for determining an analyte indicative of a disease condition are provided. In some embodiments, articles and methods described herein can be used for determining a presence, qualitatively or quantitatively, of a component, such as a particular type of cell, in a fluid sample. In one particular embodiment, a low-cost microfluidic system for rapid detection of T cells is provided. The microfluidic system may use immobilized antibodies and adhesion molecules in a channel to capture T cells from a fluid sample such as a small volume of blood. The captured T cells may be labelled with a metal colloid (eg, gold nanoparticles) using an antibody specific for the T Cell Receptor (TCR), and metallic silver can be catalytically precipitated onto the cells. The number of T cells captured can be counted and may indicate a disease condition of a patient such as severe combined immune deficiency or human immunodeficiency virus.

None of the above noted patents describe any functional components for controlling the movement of fluids or otherwise influencing the fluid within the microfluidic system. Furthermore, multiple-step reactions cannot be performed by the above described systems.

It is therefore an object of the present invention to provide a microfluidic system incorporating such functional components.

It is another preferred object to provide a microfluidic system allowing multiple-step reactions or functions to be performed.

DESCRIPTION OF THE INVENTION

According to one aspect of the present invention, there is provided a microfluidic system including a substrate in sheet form, at least one hydrophilic microfluidic channel supported on a surface of the substrate, and at least one functional component formed as part of the substrate for providing a function for the microfluidic channel.

According to one preferred embodiment, the functional component is formed by at least one cut provided within the substrate for defining a portion of the substrate displaceable relative to the remainder of the substrate, the substrate portion supporting at least part of the microfluidic channel. According to another preferred embodiment, the function component is formed by at least one cut provided within the substrate and a strip of material passing through the cut to form a sliding switch, the strip being formed of the same or similar material to the substrate, wherein at least part of the microfluidic channel is supported on the strip.

The functional component may provide a switch for controlling fluid flow along the microfluidic channel. Preferably, a plurality of said switches may be provided, the switches controlling the flow of a reactant from a dosing zone to at least one detection zone. A said detection zone may be provided on each switch. Alternatively, the switches may control the flow of a plurality of reactants from a plurality of dosing zones to at least one reactant zone. According to another preferred embodiment, a single said switch may control fluid flow along a plurality of microfluidic channels.

According to a further preferred embodiment, at least one hydrophilic channel and (or) at least one functional component described above are formed on two or more sheets of the same or different substrates. By activating at least one functional component on at least one sheet, fluid is allowed to wick from one sheet to another, thus providing a functional component capable of controlling fluid movement in a three dimensional paper-based microfluidic device.

According to another preferred embodiment of the invention, the part of the microfluidic channel supported by the functional component may provide a filter for fluid within the microfluidic channel.

The present invention preferably provides switches and other function components that can be activated on microfluidic systems fabricated on substrates in sheet form. The switch activation system can rely on different mechanisms of activation including: 1) mechanical, 2) electromagnetic, 3) chemical, 4) optical.

The applicant has developed a novel two-step method of fabricating microfluidic channels on non-woven porous material. This novel method consists of a two-step process. In the first, a hydrophobic treatment is applied to the surface to reduce the surface energy of the substrate (for hydrophobic porous materials, this step is not required). In the second, precise channels of the chosen pattern are etched on the treated surface. Plasma treatment significantly increases the surface energy of the porous substrates, rendering them wettable by water and aqueous liquids. The wettability of the porous material by liquids then provides capillary driving force and allows the penetration of liquids within and along the channels created by the plasma treatment. Various patterns can be generated; the plasma treatment leaves no visible marks on the substrate surface and does not change the flexibility or stiffness of the materials by more than 5%.

The applicant has also developed a method of fabricating a microfluidic system where a hydrophobic agent is printed onto a hydrophilic substrate to form a hydrophobic/hydrophilic contrast that defines the microfluidic channels. Both of the above referenced fabrication methods are described in more detail in the Applicant's International patent application no. PCT/AU2009/000889.

Mechanical modes of switch activation to modify fluid flow can result from any force mechanically affecting the system. The force may be applied directly, indirectly, by vacuum or by pressure to the system.

Electromagnetic modes of fluid activation triggering can result from any electric field, magnetic effect or combination thereof allowing a change in fluid flow.

Chemical modes of triggering a microfluidic system switch include any type of chemical principles. These include reaction, dissolution, precipitation, and changes in hydrophobicity, viscosity, photoreactions and the like. These involve mono or multiple reactants, surfactant, polymers, colloids.

The present invention also preferably provides a method to make microfluidic patterns on non-woven materials with filters or reagent releasing sites that can be activated by a triggering action.

The present invention further preferably provides a method to make micro-reactors on paper surface which have controlled inputs of reactants.

The present invention also preferably provides a method to facilitate multi-step reactions and tests that require time delays between each step of the reaction.

According to another aspect of the present invention, there is provided a method of producing a microfluidic system having a substrate in sheet form, at least one hydrophilic microfluidic channel supported on a surface of the substrate, and at least one functional component formed as part of the substrate for providing a function for the microfluidic channel; including forming the functional component by making at least one cut within the substrate for defining a portion of the substrate displaceable relative to the remainder of the substrate, the substrate portion supporting at least part of the microfluidic channel.

According to a further aspect of the present invention, there is provided a method of producing a microfluidic system having a substrate in sheet form, at least one hydrophilic microfluidic channel supported on a surface of the substrate, and at least one functional component formed as part of the substrate for providing a function for the microfluidic channel; including forming the function component by making at least one cut within the substrate and passing a strip of material through the cut to form a sliding switch, the strip being formed of the same or similar material to the substrate, at least part of the microfluidic channel being supported on the strip.

Plasma treatment significantly increases the surface energy of the porous substrates, rendering them wettable by water and aqueous liquids. The wettability of the porous material by liquids then provides capillary driving force and allows the penetration of liquids within and along the channels created by the plasma treatment.

The printing of hydrophobizing agents onto hydrophilic papers defines microfluidic patterns on paper. The easiness of using electronically generated printing pattern onto paper surface to make paper-based microfluidic patterns makes printing a highly desirable efficient alternative approach to fabricate channels on paper.

The materials that can be made into such devices include, but are not restricted to, non-wovens, woven fabrics, foams, composites, films and membranes. Of special interest are the materials made of cellulosic materials, including papers and non-woven, and fabrics. The paper products of interest include filter paper, office paper, chromatography paper, tissues (towel, facial, bath, wipes), newsprint, packaging paper, non-woven polymer scaffolds, etc.

Any method known in the art can be selected to hydrophobize the surface/substrate. An embodiment of the invention consists of absorbing or adsorbing a solution of hydrophobic substance dissolved in a volatile solvent. Hydrophobic substance include, but are not restricted to, AKD, ASA, rosin, latex, silicones, fluorochemicals, polyolefin emulsions, resin and fatty acids, natural and synthetic waxes and any hydrophobic substance known in the art. Another application is through vapour deposition of a hydrophobic substance.

The invention may preferably provide a fluidic pattern for transporting a fluid to analyse in parallel to different detection zones. The typical channel dimensions may vary in length from 1 mm to 10 cm and in width from 2 cm to 100 μm. The fluidic system has typically the same rigidity, mechanical, properties and softness as those of the original substrate.

Alternatively, the invention may provide switches which can be activated by, but not restricted to, contact mechanical force, non-contact mechanical forces such as vacuum and pneumatic air jets, electrostatic and electromagnetic triggering mechanisms.

The present invention may also provide filters, ion exchange sites and reagent releasing reservoirs for a microfluidic system that can be switched into the microfluidic channels on demand.

The present invention therefore provides simple and versatile techniques to manufacture inexpensive microfluidic patterns systems on substrates, including flexible substrates such as paper, non-woven, foam and porous media with functional components, such as switches, micro-reactors and filters. Applications include low-cost bio-assays and indicators to monitor specific health or environmental conditions. These functional components strongly enhance the capabilities of the paper microfluidic systems, enable tests consist of more than one reaction to be carried out on low-cost microfluidic systems. A preferred embodiment of the invention consists of fabricating microfluidic devices on porous, non-woven and woven substrates that have functional and intelligent component using plasma treatment with a mask and digital or contact printing methods.

Furthermore, this invention identifies the potential of microfluidic systems built on paper and other porous materials to enable multiple-step reactions and to be used as indicators and micro-reactors. To fulfil this potential, switches, filters and reaction sites can be designed and built in the microfluidic channels to control the flow and reaction of analytes and indicators.

BRIEF DESCRIPTION OF THE DRAWINGS

It will be convenient to further describe the invention with reference to the accompanying drawings which illustrate examples of the present invention. Other examples are possible, and consequently the particularity of the accompanying drawings is not be understood as superseding the generality of the preceding description of the invention.

In the drawings.

DETAILED DESCRIPTION OF THE INVENTION

The following description describes various examples of microfluidic systems incorporating a functional component according to the present invention.

EXAMPLE 1

Referring initially to FIGS. 1 to 4, there is shown arrangements where a functional component according to the present invention is integrally formed from the same material as the substrate supporting the microfluidic system.

In one example of the invention, a filter paper was hydrophobized by immersion in a solution of AKD dissolved in heptane and the solvent was allowed to evaporate. A heat treatment of the treated paper in an oven at 100° C. for 30-50 minutes was applied. In the second step, a solid mask was applied to the paper substrate and the system was exposed to a plasma reactor (K1050X plasma asher (Quorum Emitech, UK) for 10-100 seconds at the intensity of 12-50 W). The plasma treatment left no visible mark on the sample and the sample retained its original softness and flexibility. The treated channel becomes wettable by aqueous solutions and allows the capillary transport of the solutions (FIG. 1(*a*)). In the third step, a cut was made across the channel in the way shown in FIG. 1(*b*), but not restricted to it, to form the functional component according to the present invention. When this channel was folded in an angle to the paper sheet, capillary flow in the channel stopped at the point of the cut (FIG. 1(*b*)). When the cut section was folded back into the paper sheet, the plasma treated area was made to contact the fluidic channel, enabling the capillary flow through the cut paper (FIG. 1(*c*)). The capillary flow continues on. The functional component is therefore in the form of a mechanical switch. The activation of the switch can also be achieved by various means using contact and non-contact actions as claimed above.

Figure 2:
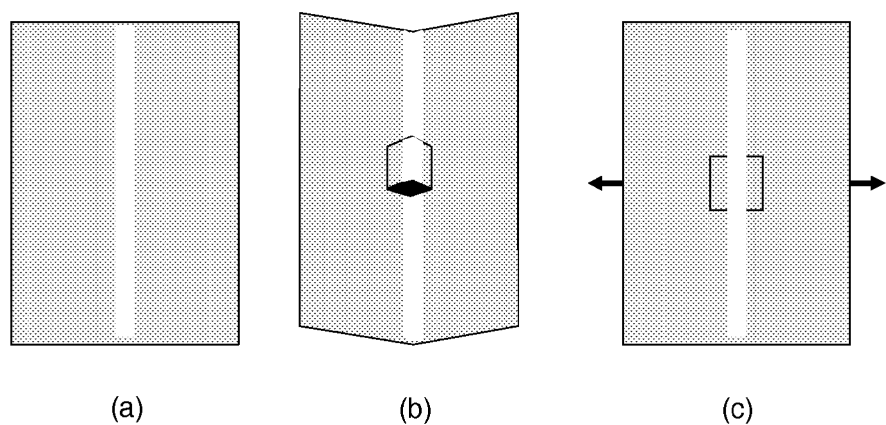
FIG. 2(*a*) to (c) are schematic views showing a second example of the present invention.

Another way is to make a functional component in the form of a mechanical switch is to make two parallel cuttings across the capillary flow channel (FIG. 2). The switch can be activated by a pulling action. The switch can also be activated by various means using contact and non-contact actions as claimed above.

Figure 3:
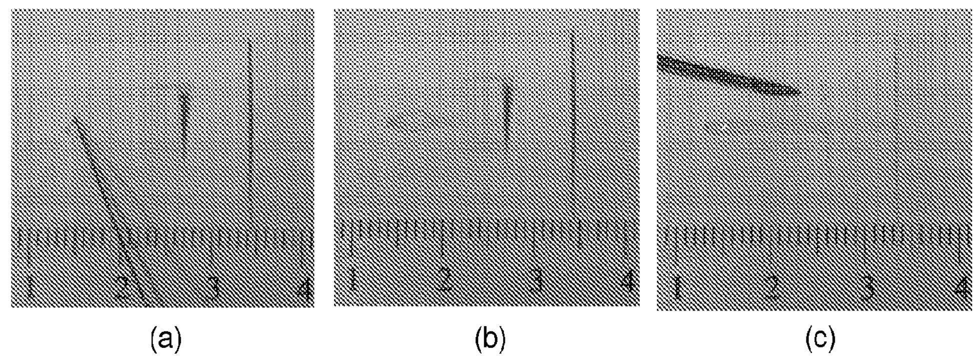
FIG. 3(*a*) to (c) are photos showing the operation of a switch according to the present invention.

FIG. 3 shows the operation of a switch made using the design in FIG. 2(*a*) to (c), and shows (a) Introduction of liquid onto the device; (b) switch in off (0) position; (c) switch is triggered by mechanical contact force and is in on (1) position.

Figure 1:
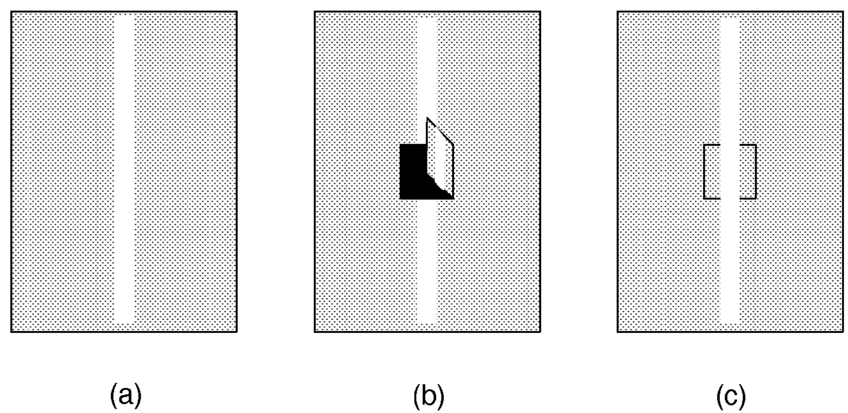
FIG. 1(*a*) to (c) are schematic views showing a first example of the present invention.
Figure 4:
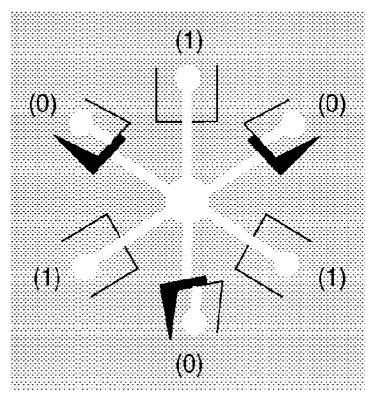
FIG. 4 is a schematic view of a third example of the present invention.

The functional component as shown in FIGS. 1 to 3 can be easily incorporated in a paper-based microfluidic system. FIG. 4 shows one of the many possibilities which shows a design of a microfluidic system consisting of one sample dosing zone (centre) and six detection zones; sample can be directed to any detection zone by operating switches. (0) is off and (1) is on.

Using this design, a fluid doped into any of the sample doping zones can be directed, via the use of switches, into any other part of the fluidic circuit, with any time delay required.

EXAMPLE 2

Figure 5:
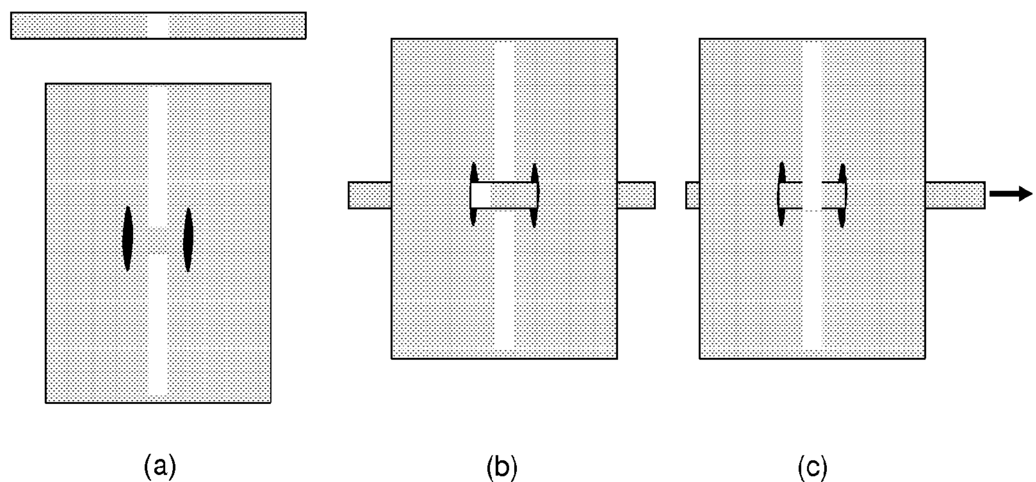
FIG. 5 is a schematic view of a fourth example of the present invention.
Figure 6:
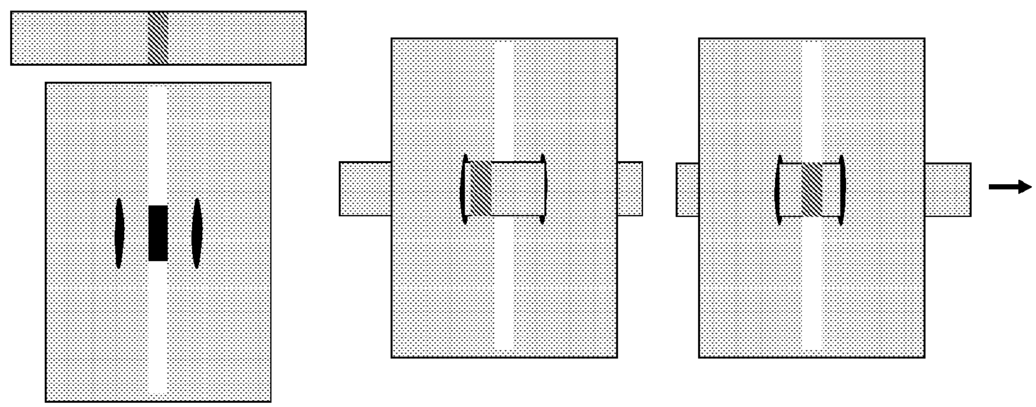
FIG. 6 is a schematic view of the example of FIG. 5 showing its operation.
Figure 7:
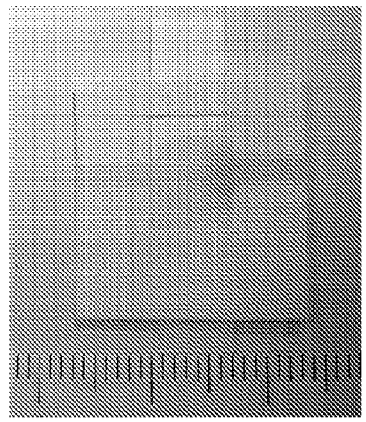
FIG. 7 is a photo showing the filter of FIG. 5 in operation.

FIGS. 5 to 7 show arrangements where a functional component according to the present invention is formed using material that is the same as or similar to the material of the substrate of the microfluidic system, where the functional component is formed separately from that substrate.

In this example more than one piece of paper was plasma treated in the way shown in FIG. 5(*a*). The lighter areas indicate the treated areas. The fluidic channel on the paper was not treated all way through the paper, but has a gap equal to or larger than 0.5 mm. Two cuts were made parallel to the channel and on both sides of the untreated gap. A paper strip wider than the gap in the fluidic channel was given a plasma treatment across it as shown in FIG. 5(*a*).

The two pieces of paper can be assembled to form a functional component in the form of a sliding switch as shown in FIG. 5(*b*). FIG. 5(*b*) shows the "off" position of the switch, since the treated areas on the paper strip does not match with capillary flow channel. When the strip is pulled, the sliding switch was activated and allowed liquid to penetrate through and across the sliding switch. FIG. 5(*c*) shows the sliding switch in the "on" position.

EXAMPLE 3

In the example of the invention as shown in FIG. 6, the "sliding switch" arrangement shown in FIG. 5(*a*) to (c) is used in a different application to provide a microfluidic filter. These filters and reagent releasing sites can also be built in the microfluidic systems made of paper and other non-woven materials. Ion-exchange resins, high specific surface area functionalized and not functionalized nano particles, antibodies and antigens, can be deposited or printed onto any of the above filters. When a complex sample solution is delivered into sample doping zone, it can be sent to a detection or reaction zone via a filter, which can immobilize the interference ions and molecules in the sample before it reaches the detection and reaction zone. As, a sample liquid flow through the filter via capillary wicking, specific ions, specific molecules, virus and specific biomolecules will be bond and immobilized by the materials in the filter (FIG. 6(*c*)).

FIG. 7 shows the filter of FIGS. 6(*a*) to (c) in operation. The sample used was a diluted ink jet ink, the filter was a piece of matt ink jet paper which has a dye capture coating layer. For the purpose of showing the concept, the size of the coating area was not controlled. A diluted ink jet ink solution was introduced from the right end of the device. Most dye was immobilized by the dye capturing coating layer on the filter. The sample liquid penetrated passing the filter to the left side of the device was free of dye.

A reagent releasing site can be designed in a similar way as a filter. The paper strip (FIG. 5(*a*)) does not require plasma treatment. A narrow band of coating of water soluble reagent supported by hydrophilic coating media is deposited on the paper strip. When the paper strip is activated, the sample will leach the reagent off the coating media on the paper strip and carry it forward.

EXAMPLE 4

This example shows an application of the present invention which allows a microfluidic system to be used for multiple-step restrictions or functions to be performed.

Figure 8:
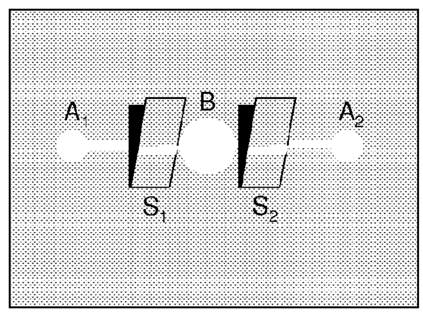
FIG. 8 is a schematic view of a further example of the present invention.

Well controlled microfluidic reactors can be made on paper- and other non-woven-based materials using micro-channels and functional components according to the present invention such as filters and switches. FIG. 8 shows the concept of a simple reactor that has two inlets.

The concept of microfluidic reactors built on low-cost microfluidic detectors, indicators, diagnostic devices uniquely facilitate multi-step reactions.

This microfluidic reactor consists of two sample dosing zones (A1 and A2), one reaction zone (B) and two switches (S1 and S2). Two reactants can be introduced into the reactor B in a controlled manner with any time delay required.

Figure 9:
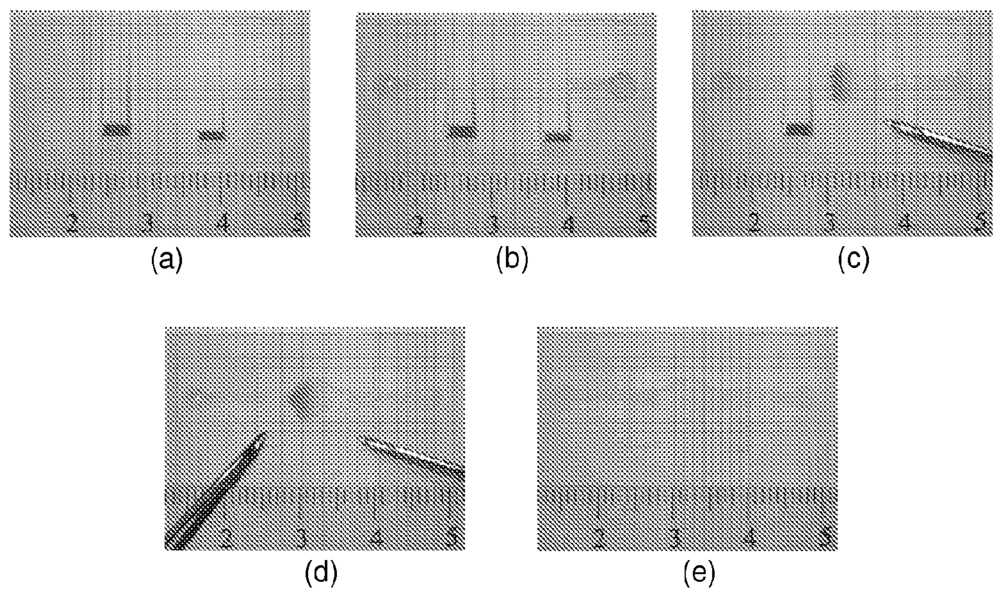
FIG. 9(*a*) to (e) are photos showing the operation of the example of FIG. 8.

FIG. 9 shows the microfluidic reactor in operation. A small quantity of phenolphthalein indicator was placed into the reaction zone (B) to demonstrate an acid-base neutralization reaction. A microfluidic reactor of the design of FIG. 8 was built for demonstration (FIG. 9(*a*)). A NaOH and a HCl solution were introduced into samples dosing zones A2 and A1, respectively (FIG. 9*b*)). Both switches were in "off" position. Switch S2 was then switched on to allow the NaOH solution to enter the reaction zone. As the NaOH solution entered the reaction zone, a change of indicator colour was observed (FIG. 9(*c*)). Then S1 was switched on to allow the HCl solution to enter the reaction zone (FIG. 9(*d*)). As the HCl solution entered the reaction zone, neutralization reaction occurred. FIG. 9(*e*) shows the expected fading of indicator colour as the neutralization reaction completed.

Figure 10:
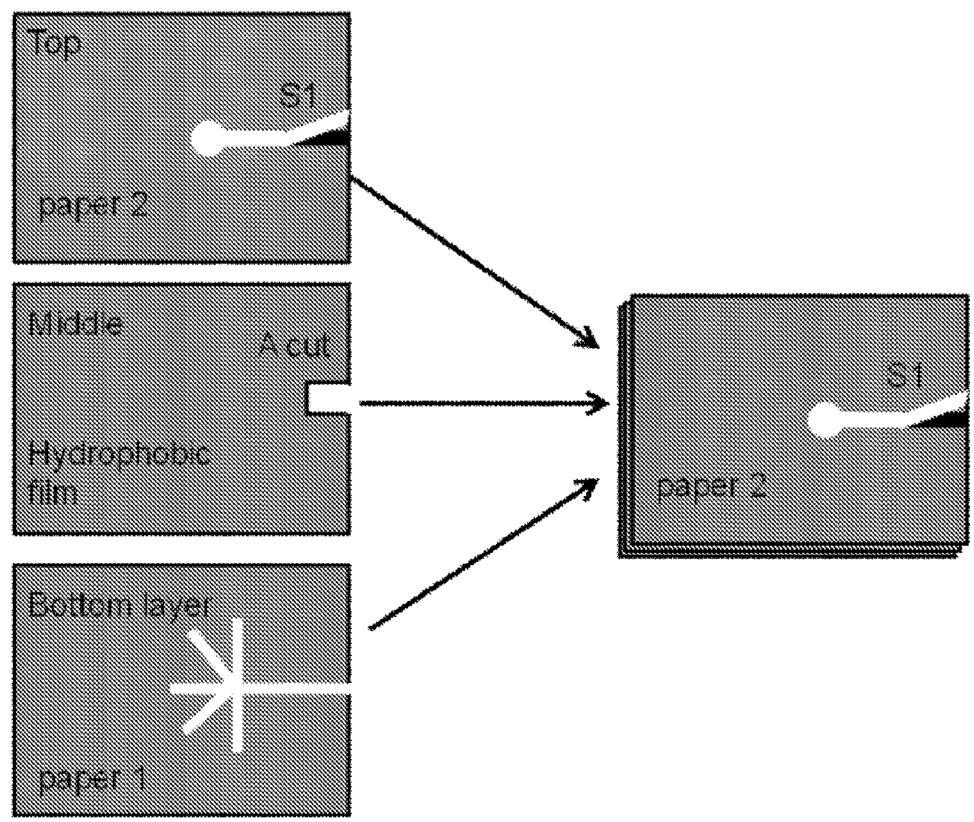
FIG. 10 is a schematic drawing of a control switch for a three dimensional paper-based microfluidic system.

FIG. 10 is a schematic drawing of a control switch for a three dimensional paper-based microfluidic system. The three dimensional paper-based microfluidic device can be built as shown in FIG. 10. Hydrophilic channels are formed on both the top and bottom sheets of papers. On the top paper sheet the hydrophilic channel is cut as shown in FIG. 10 so that it can be moved (S1). A hydrophobic medium in sheet or film form with a cut notch (or a hole, not shown) is sandwiched in between the two sheets. By aligning the channels on the paper sheets with the notch in the hydrophobic medium, a switch can be formed. The operation of the switch involves pushing the switch (S1) down to make contact with the hydrophilic channel in the bottom paper sheet through the notch in the hydrophobic film.

The invention claimed is:

1. A microfluidic system including:

a cellulosic substrate in sheet form;

at least one hydrophilic microfluidic channel supported on a surface of the a substrate and at least one functional component supporting at least part of the microfluidic channel, the at least one microfluidic channel having upper lateral edges defined by a hydrophobic treatment on the surface of the substrate, said component providing a switch for controlling fluid flow along the microfluidic channel, wherein the fluid flows through the hydrophilic microfluidic channel driven by capillary wicking.

2. A microfluidic system according to claim 1, wherein the functional component is formed by at least one cut provided within the substrate for defining a portion of the substrate displaceable relative to the remainder of the substrate, the substrate portion supporting at least part of the microfluidic channel.

3. A microfluidic system according to claim 1, wherein the functional component is formed by at least one cut provided within the substrate and further comprises a strip of material passing through the cut to form a sliding switch wherein at least part of the microfluidic channel is supported on the strip.

4. A microfluidic system according to claim 2 or 3 wherein the part of the microfluidic channel supported by the functional component provides a filter for fluid within the microfluidic channel.

5. A microfluidic system according to claim 1, including a plurality of said switches, the switches controlling the flow of a reactant from a dosing zone to at least one detection zone.

6. A microfluidic system according to claim 5, wherein the detection zone is provided on the switch.

7. A microfluidic system according to claim 1, including a plurality of said switches, the switches controlling the flow of a plurality of reactants from a plurality of dosing zones to at least one reactant zone.

8. A microfluidic system according to claim 1, wherein a single said switch controls fluid flow along a plurality of microfluidic channels.

9. A microfluidic system according to claim 1, wherein the substrate includes a plurality of portions, wherein the functional component is provided on one of said portions of the substrate, and the microfluidic channel is provided on another of said portions of the substrate.

10. A method of producing a paper-based microfluidic system having a cellulosic material substrate in sheet form, at least one hydrophilic microfluidic channel supported on a surface of the substrate, and at least one functional component supporting at least a part of the hydrophilic channel providing a switch for controlling fluid flow along the microfluidic channel, said method comprising:

(a) forming the at least one microchannel wettable by aqueous liquids by:

(i) applying a hydrophobic treatment to the surface of the cellulosic material substrate to form a hydrophobic / hydrophilic contrast that defines the at least one microchannel; or (ii) applying a hydrophobic treatment to the surface of the cellulosic material substrate, then pattern etching the at least one microchannel into the hydrophobized surface of the cellulosic material substrate; and (b) forming the functional component by making at least one cut within the substrate for defining a portion of the substrate displaceable relative to the remainder of the substrate, the substrate portion supporting at least part of the microfluidic channel.

11. The method of claim 10, wherein the at least one microchannel is formed by applying a hydrophobic treatment to the surface of the cellulosic material substrate, then pattern etching the at least one microchannel into the hydrophobized surface of the cellulosic material substrate, wherein the pattern etching is done by patterned plasma etching.

12. A microfluidic system produced by the method of claim 10.

13. A method of producing a paper-based microfluidic system having a cellulosic material substrate in sheet form, at least one hydrophilic microfluidic channel supported on a surface of the substrate, and at least one functional component supporting at least a part of the hydrophilic channel providing a switch for controlling fluid flow along the microfluidic channel, said method comprising:

(a) forming the at least one microchannel wettable by aqueous liquids by:

(i) applying a hydrophobic treatment to the surface of the cellulosic material substrate to form a hydrophobic / hydrophilic contrast that defines the at least one microchannel; or (ii) applying a hydrophobic treatment to the surface of the cellulosic material substrate, then pattern etching the at least one microchannel into the hydrophobized surface of the cellulosic material substrate; and (b) forming the functional component by making at least one cut within the substrate and further comprising passing a strip of material through the cut to form a sliding switch, wherein, at least part of the microfluidic channel being supported on the strip.

14. The method of claim 13, wherein the at least one microchannel is formed by applying a hydrophobic treatment to the surface of the cellulosic material substrate, then pattern etching the at least one microchannel into the hydrophobized surface of the cellulosic material substrate, wherein the pattern etching is done by patterned plasma etching.

15. A microfluidic system produced by the method of claim 13.

16. A microfluidic system including:

a cellulosic substrate in sheet form;

at least one hydrophilic microfluidic channel supported on a surface of the a substrate, the at least one microfluidic channel being wettable by aqueous liquids and having upper lateral edges defined by a hydrophobic treatment on the surface of the substrate;

and at least one functional switch for controlling fluid flow along the microfluidic channel;

said switch containing at least a portion of the microfluidic channel displaceable relative from the remainder of the substrate; and wherein the switch provides a discontinuity in fluid communication of the hydrophilic microchannel when the switch is displaced relative to the substrate and the switch provides a continuous fluid flow along the microfluidic channel when the hydrophilic microfluidic channel of the switch and the substrate are aligned; and wherein fluid flows along hydrophilic microfluidic channel driven by capillary wicking.

* * * * *